(12) United States Patent
Bui

(10) Patent No.: US 8,331,307 B2
(45) Date of Patent: Dec. 11, 2012

(54) METHOD OF PHYSICAL RESOURCE MANAGEMENT IN A WIDEBAND COMMUNICATION SYSTEM

(75) Inventor: Thanh Bui, Victoria (AU)

(73) Assignee: NEC Corporation, Tokyo (JP)

( * ) Notice: Subject to any disclaimer, the term of this patent is extended or adjusted under 35 U.S.C. 154(b) by 976 days.

(21) Appl. No.: 12/087,510

(22) PCT Filed: Jan. 18, 2007

(86) PCT No.: PCT/JP2007/051112
§ 371 (c)(1),
(2), (4) Date: Jul. 9, 2008

(87) PCT Pub. No.: WO2007/083830
PCT Pub. Date: Jul. 26, 2007

(65) Prior Publication Data
US 2009/0010214 A1     Jan. 8, 2009

(30) Foreign Application Priority Data

Jan. 18, 2006  (AU) ................................ 2006900260
Jan. 12, 2007  (AU) ................................ 2007200145

(51) Int. Cl.
| | |
|---|---|
| H04J 9/00 | (2006.01) |
| H04J 3/16 | (2006.01) |
| H04L 12/28 | (2006.01) |
| H04W 4/00 | (2009.01) |
| H04W 40/00 | (2009.01) |
| H04W 68/00 | (2009.01) |

(52) U.S. Cl. ...................... 370/330; 370/204; 370/395.4; 370/437; 370/468; 455/434; 455/447; 455/450

(58) Field of Classification Search .......... 370/203–208, 370/210, 311–312, 328–330, 395.4, 437, 370/468; 455/434, 447, 450–453
See application file for complete search history.

(56) References Cited

U.S. PATENT DOCUMENTS

| | | | |
|---|---|---|---|
| 8,072,931 B2 | 12/2011 | Higuchi et al. | |
| 2004/0121780 A1* | 6/2004 | Nasshan | 455/455 |
| 2004/0252662 A1* | 12/2004 | Cho | 370/329 |
| 2005/0128993 A1* | 6/2005 | Yu et al. | 370/342 |
| 2007/0076668 A1* | 4/2007 | Tirkkonen et al. | 370/335 |
| 2007/0086406 A1* | 4/2007 | Papasakellariou | 370/343 |

(Continued)

FOREIGN PATENT DOCUMENTS

JP         11-27231         1/1999

(Continued)

OTHER PUBLICATIONS

Japanese Office Action dated May 30, 2012.

*Primary Examiner* — Habte Mered
*Assistant Examiner* — Redentor Pasia
(74) *Attorney, Agent, or Firm* — McGinn IP Law Group, PLLC

(57) ABSTRACT

In a wideband communication system including a transmitter and a plurality of mobile terminals (MT) that have maximum reception bandwidths, respectively, a Shared Control Channel (SCCH) for each MT is mapped so that physical channel symbols from the corresponding Physical Shared Control Channels (PSCCH) are confined to a block of consecutive sub-carriers defined by a smallest one of the maximum reception bandwidths.

22 Claims, 6 Drawing Sheets

U.S. PATENT DOCUMENTS

| | | | |
|---|---|---|---|
| 2007/0140106 A1* | 6/2007 | Tsai et al. | 370/208 |
| 2007/0183306 A1* | 8/2007 | Akita et al. | 370/208 |
| 2007/0190967 A1* | 8/2007 | Cho et al. | 455/403 |
| 2008/0013516 A1* | 1/2008 | Zhang et al. | 370/342 |
| 2008/0318527 A1* | 12/2008 | Higuchi et al. | 455/42 |
| 2009/0010213 A1* | 1/2009 | Yamada et al. | 370/329 |
| 2009/0135802 A1* | 5/2009 | Haga et al. | 370/350 |
| 2009/0232062 A1 | 9/2009 | Higuchi et al. | |
| 2012/0008584 A1 | 1/2012 | Higuchi et al. | |
| 2012/0020321 A1 | 1/2012 | Higuchi et al. | |

FOREIGN PATENT DOCUMENTS

| | | |
|---|---|---|
| JP | 2001-230744 | 8/2001 |
| JP | 2001-238269 | 8/2001 |
| JP | 2005-252786 | 9/2005 |
| JP | 2007-221755 (A) | 8/2007 |
| WO | WO 2007/023810 A1 | 3/2007 |

* cited by examiner

METHOD OF PHYSICAL RESOURCE MANAGEMENT IN A WIDEBAND COMMUNICATION SYSTEM

FIELD OF THE INVENTION

The present invention relates generally to wideband communication systems, and in particular to methods of managing physical resources in such wideband communication systems. The invention is suitable for use in the management of shared control channels for mobile terminals having different capabilities within an OFDMA network, and it will be convenient to describe the invention in relation to that exemplary, but non-limiting, application.

BACKGROUND ART

For convenience, terminology adopted by the 3GPP (3rd Generation Partnership Project) will be used throughout detailed description of this specification e.g. User Equipment and UE. However the present invention should not be considered as being limited to application in systems implemented in accordance with 3GPP standards.

The Orthogonal Frequency Division Multiple Access (OFDMA) system divides the frequency domain and time domain and allocates a sub-channel to each user. Each sub-channel comprises a plurality of sub-carriers (frequency domain), and a plurality of time slots (time domain). The OFDMA system is based on a multiple access scheme capable of accommodating multiple users using limited frequency resources by performing resource allocation whilst taking into account both the time and frequency domains.

The OFDMA system is intended to support a flexible transmission bandwidth up to 20 MHz. However, User Equipment (UE) having a lesser capability must also be supported. The UE capability is defined as maximum reception bandwidth that UE can support. FIG. 1 is a representation 10 of an exemplary set of camp bands in an OFDMA system having a 20 MHz transmission bandwidth and supporting different UE capabilities. It can be seen from this figure that within the 20 MHz transmission bandwidth, it is possible to have one camp band for 20 MHz UE capability and multiple camp bands for 5, 10 and 15 MHz UE capability. Three camp bands 14, 16 and 18 are illustrated for 15 MHz UE, three camp bands 20, 22 and 24 are illustrated for 10 MHz UE, and seven camp bands 26 to 38 are represented for 5 MHz UE.

In such a system, the various UE initially camps at a central frequency in order to receive information from the broadcast channel (BCH), synchronization channel (SYNCH) and paging channel (PCH) within the transmission bandwidth 40. Once the UE has performed cell search procedure, time and frequency correction and synchronization with a base station, the UE remains idle until information is received from within the bandwidth 40 to instruct the UE to move to one of the multiple camp bands shown in FIG. 1. Once there, the UE monitors the shared control channel (SCCH) and determines when information subsequently received on the shared data channel is intended for that UE.

Information from the transport shared control channel (SCCH) for each UE is mapped to a physical shared control channel (PSCCH) for transmission to each UE. In the OFDMA system, it is intended that any UE shall only receive PSCCHs in a camp band corresponding to the reception bandwidth capacity of that UE. Moreover, it is intended that transmissions to UEs having different reception bandwidth capacities can be scheduled within a same Transmission Time Interval (TTI). The structure of the SCCH and PSCCH should also be such that any UE can apply the same processing to receive the shared control channel regardless of the position of the UE's camp band within the transmission band. Finally, all available SCCHs in the system can be grouped into sets. Each SCCH set may contains multiple SCCHs. Each UE is required to monitor one or more SCCH sets depending upon its capability.

DISCLOSURE OF THE INVENTION

Problem to be Solved by the Invention

It would be desirable to provide a method of physical resource management in a wideband communication system that meets these requirements whilst enabling efficient physical resource sharing between all UEs having different capabilities and efficient control of shared control channel performance for all UEs.

It would also be desirable to provide a method of physical resource management in a wideband communication system that ameliorates or overcomes one or more disadvantages of known physical resource management methods.

Means for Solving the Problem

In a first aspect the present invention provides a method of physical resource management in a wideband communication system, the system including at least one transmitter for transmitting on a plurality of physical sub-carriers occupying a transmission bandwidth and a plurality of mobile terminals (MT) each having a respective maximum reception bandwidth, the method including the steps of:

identifying a smallest maximum reception bandwidth amongst the plurality of MT; and mapping a Shared Control Channel (SCCH) for each MT so that the physical channel symbols from the corresponding Physical Shared Control Channels (PSCCH) are confined to a block of consecutive sub-carriers defined by the smallest maximum reception bandwidth amongst the plurality of MT. The step of mapping the SCCH for each MT preferably includes causing the physical channel symbols of the corresponding PSCCH to occupy the same number of sub-carriers as the PSCCH of each other MT.

The step of mapping the SCCH for each MT can further include, causing the physical channel symbols from the corresponding PSCCH to have the same position mapping pattern as the PSCCH of each other MT.

In the method, the step of mapping the SCCH for each MT can include mapping the physical channel symbols to consecutive sub-carrier positions within its corresponding block. Alternatively, the method can include, mapping the physical channel symbols to distributed sub-carrier positions within its corresponding block.

The method of physical resource management preferably includes, adjusting the power and/or sub-carrier positions allocated to at least one PSCCH on the basis of at least one received channel quality indication (CQI) for each PSCCH.

The method may further include, selecting the sub-carrier positions occupied by the physical channel symbols from each PSCCH within each block so that the total power allocated to all PSCCHs in that block is minimised. Alternatively the method can include, selecting the sub-carrier positions occupied by the physical channel symbols from each PSCCH so that the total power allocated to all PSCCHs is minimised across the whole transmission bandwidth.

The allocation can be made on the basis of a plurality of received CQIs per PSCCH. Moreover, the method may further include assessing channel quality by averaging the received CQI over a plurality of Transmission Time Intervals (TTIs). In certain embodiments, the method can further include, assessing channel quality by averaging a plurality of CQIs received in relation to a set of sub-carriers occupied by a PSCCH in a same Transmission Time Interval (TTI).

In a preferred form the wideband communication system operates according to Orthogonal Frequency Division Multiple Access (OFDMA) principles.

The transmission bandwidth can preferably be selected from a group including 5 MHz, 10 MHz, 15 MHz and 20 MHz. The maximum reception bandwidth of the MT can be selected from 5, 10, 15 or 20 MHz. The maximum reception bandwidth of the MT can be different to one another.

In a second aspect, the present invention provides a base station for transmitting on a plurality of physical sub-carriers occupying a transmission bandwidth and forming part of a wideband communication system together with a plurality of mobile terminals, the base station including one or more components to implement a method according to any one of the preceding claims.

The various aspects and advantages of the invention will be more clearly understood from the following detailed description of an exemplary, but non-limiting embodiment of the invention taken in conjunction with the accompanying drawings.

BEST MODE FOR PERFORMING THE INVENTION

Figure 1:
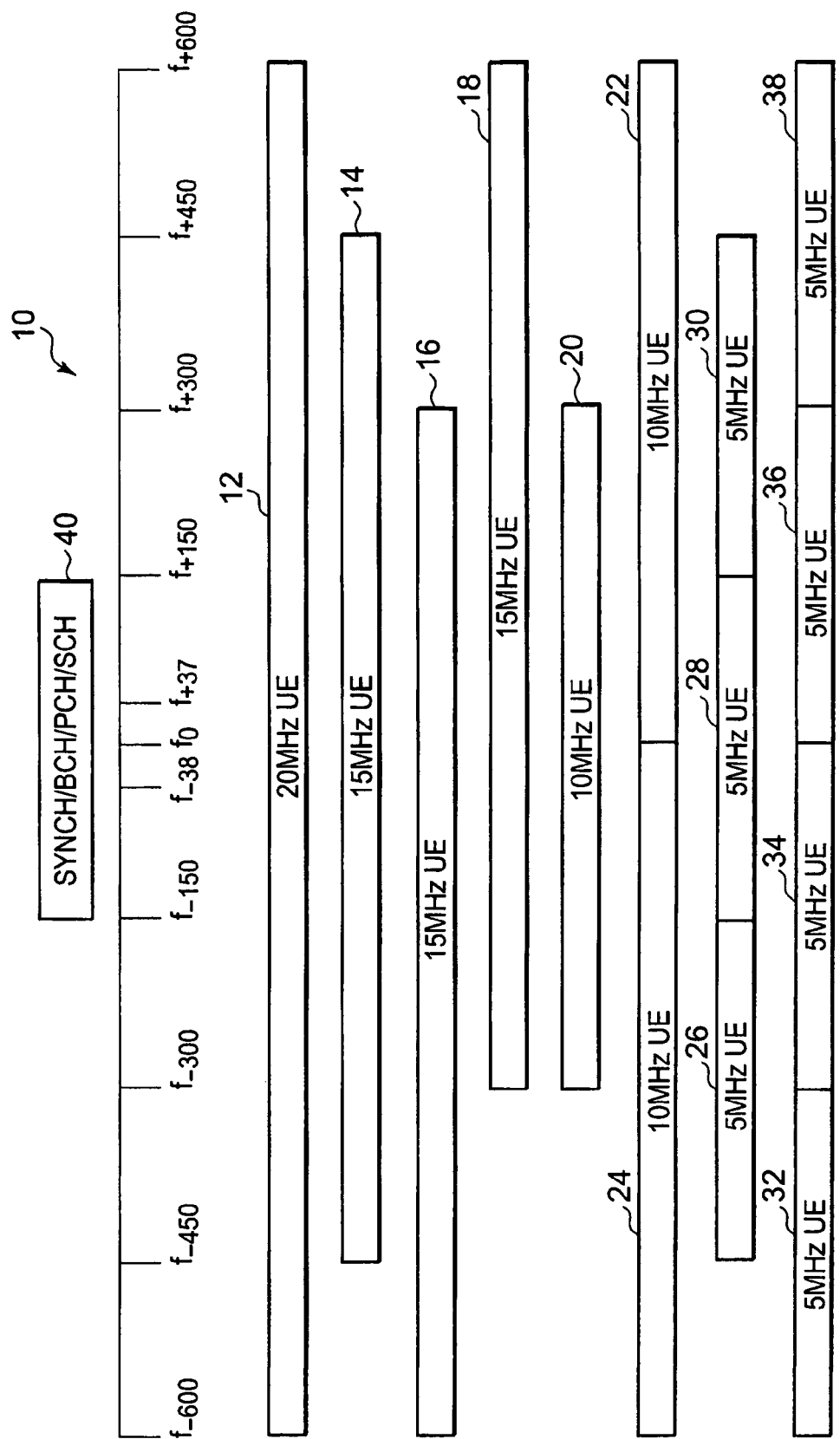
FIG. 1 is a schematic representation of the camping operation of various UEs of differing reception capabilities (i.e. 5, 10, 15 and 20 MHz UE) in a wide band OFDMA system with 20 MHz transmission bandwidth.
Figure 2:
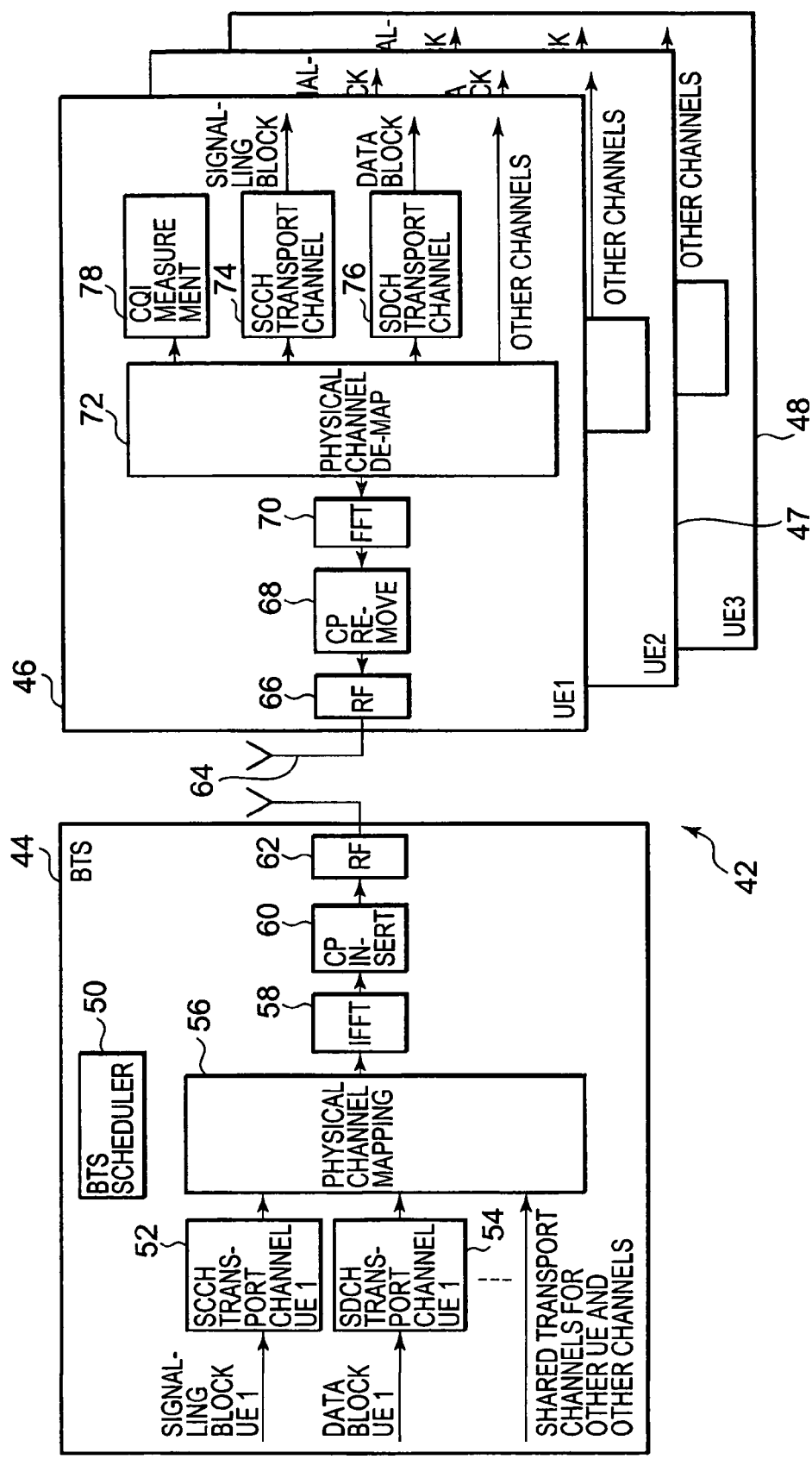
FIG. 2 is a schematic diagram of a communication system including a base station and multiple UE operating in accordance with the present invention.

FIG. 2 shows an exemplary OFDMA wideband communication system 42 including a base station (BTS) 44 and exemplary UEs 46, 47 and 48. The base station 44 includes a packet scheduler 50, transport channel processing blocks for the SCCH and SDCH for each scheduled UE (represented by reference numerals 52 and 54 respectively), transport and other channels, Physical channel mapping block 56, an Inverse Fast Fourier Transform (IFFT) processor 58, Cyclic Prefix (CP) insertion block 60, Radio Frequency block (RF) 61 and antenna 62.

Each UE 46, 47 and 48 includes an antenna 64, a RF processing block 66, a Cyclic prefix removal block 68, a Fast Fourier Transform (FFT) processor 70, a physical channel de-mapping block 72, transport processing blocks 74 and 76 for SCCH & SDCH, and a CQI (channel quality indication) measurement block 78.

The Scheduler block 50 controls the overall resource allocation and data transmission to all UEs 46, 47, 48 connected to the BTS 44. In each TTI, for each scheduled UE (such as UE1 46), the control signalling block for UE1 is inputted into SCCH transport channel block 52. This block will perform typical operation such as channel coding, rate matching, interleaving and possible masking by identity of UE1. Rate matching is used to match encoded data to a number of available physical symbols. Physical channel mapping block 56 maps output of SCCH transport channel of UE1 into allocated physical resource in frequency and time grid (wherein each TTI consists of multiple OFDM symbols and each OFDM symbol consists of multiple frequency sub-carriers) together with other scheduled UEs and other channels. Physical channel mapping block 56 performs power scaling for all physical channels following the instructions from Scheduler block 50. For each OFDM symbol, an IFFT is used to convert physical frequency sub-carriers into time domain signal. Cyclic prefix is then added and the resulting signal will go through RF block 62 to be transmitted to UE.

Each UE 46, 47, 48 performs reverse processing at the receiving end to extract SCCH and then SDCH. Each UE 46, 47, 48 also performs CQI measurement for reporting to the BTS 44.

Table 1 shows an exemplary set of parameters for downlink transmission in an OFDMA communication system such as that shown in FIG. 2.

TABLE 1

| Transmission BW | 1.25 MHz | 2.5 MHz | 5 MHz | 10 MHz | 15 MHz | 20 MHz |
|---|---|---|---|---|---|---|
| Sub-frame duration | | | 0.5 ms | | | |
| Sub-carrier spacing | | | 15 kHz | | | |
| Sampling frequency | 1.92 MHz (½ × 3.84 MHz) | 3.84 MHz | 7.68 MHz (2 × 3.84 MHz) | 15.36 MHz (4 × 3.84 MHz) | 23.04 MHz (6 × 3.84 MHz) | 30.72 MHz (8 × 3.84 MHz) |
| FFT size | 128 | 256 | 512 | 1024 | 1536 | 2048 |
| Number of occupied sub-carriers †, †† | 76 | 151 | 301 | 601 | 901 | 1201 |

This table shows notably the correspondence between the different transmission bandwidth and the total number of sub-carriers (FFT) size as well as the number of sub-carriers available for data transmission (occupied sub-carriers) in an OFDMA system. For example, for a BTS having a transmission bandwidth of 5 MHz, a block of 301 consecutive sub-carriers are available, whereas for a BTS having a transmission bandwidth capability of 20 MHz, a block of 1201 consecutive sub-carriers are available for information transmission in the downlink.

Figure 3:
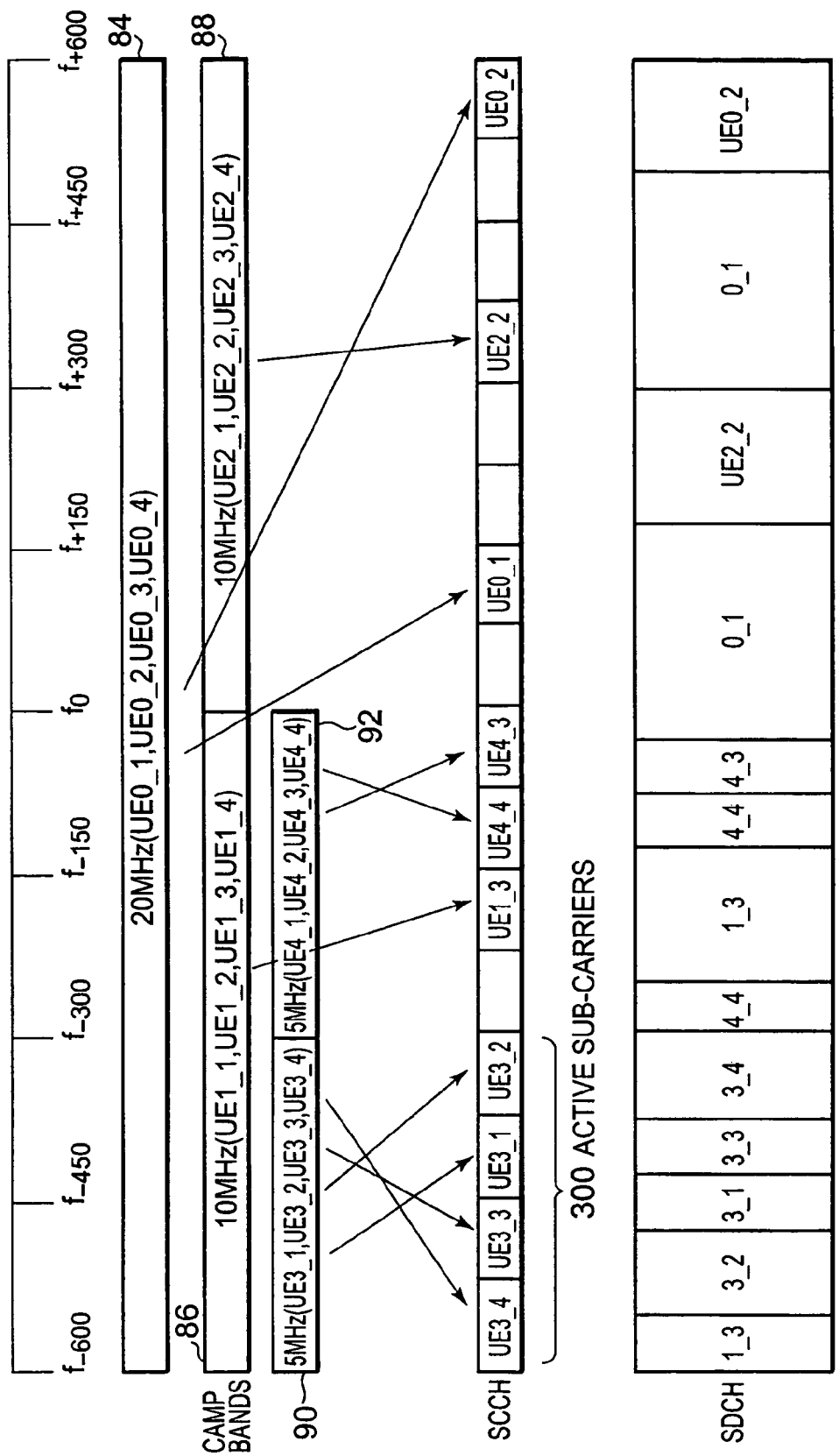
FIG. 3 is a schematic representation of a first embodiment of a mapping of the SCCH to PSCCH and SDCH to PSDCH for UEs of different capacities operating in the wideband communication system.

FIG. 3 shows an exemplary channel mapping for a plurality of UEs having different reception bandwidth capabilities in communication with a BTS, which forms part of an OFDMA system. In this example, the BTS has a 20 MHz transmission bandwidth. UE 0_1, UE0_2, UE0_3 and UE0_4 each have a 20 MHz reception bandwidth capability and camp on band 84. UE1_1, UE1_2, UE1_3 and UE1_4 each have a reception bandwidth capability of 10 MHz and camp on band 86 overlapping half of the camp band 84. Similarly, UE2_1, UE2_2, UE2_3 and UE2_4 each have a reception bandwidth capability of 10 MHz and camp on band 88 overlapping the other half of the camp band 84. UE3_1, UE3_2, UE3_3 and UE3_4 each have a reception bandwidth capability of 5 MHz and camp on band 90 overlapping half of the camp band 86, whilst UE4_1, UE4_2, UE4_3 and UE4_4 each have a reception bandwidth capability of 5 MHz and camp on band 92 overlapping the other half of the camp band 86.

The physical channel mapping for the SCCH of each UE is carried out by the packet scheduler 50 of the base station 44 so that the physical channel symbols from the PSCCH for any UE capability are confined to a block of consecutive sub-carriers defined by the maximum reception bandwidth that smallest UE capability can support. In the example shown in FIG. 3, the smallest maximum reception bandwidth of any UE is 5 MHz. Accordingly, the physical channel symbols from the PSCCH for any UE are confined to a block of 301 consecutive sub-carriers defined by that 5 MHz bandwidth.

Even though a greater number of consecutive sub-carriers are available for user equipment (UE) having a 10 MHz, 15 MHz or 20 MHz capacity, limiting the size of consecutive sub-carriers used for each PSCCH to a size defined by the smallest maximum reception bandwidth of any UE intended to operate in a system avoids collision between SCCHs of different UE capabilities and accordingly simplifies both the scheduling algorithm performed by the packet scheduler in the base station and the manner with which each UE is able to interpret information received on each SCCH. If each PSCCH was not confined to the smallest maximum reception bandwidth of any UE operable in the system, it would be impossible to schedule UE1_3 (having a 10 MHz reception bandwidth capability) and UE3_1, UE3_2, UE3_3 and UE3_4 (having a 5 MHz reception bandwidth capability), simultaneously in a same Transmission Time Interval (TTI). Moreover, the required scheduling algorithm would be very complex. Not only would the scheduler be required to take care of prioritising data to be transmitted for each UE in a TTI based on service priority, size of data buffer, Channel Quality Indication (CQI), etc, but the scheduler would also be required to avoid collisions between the SCCHs of UEs having different reception bandwidth capabilities.

In the exemplary embodiment shown in FIG. 3, each PSCCH occupies only ¼ of the block of 300 consecutive active sub-carriers within each 5 MHz transmission bandwidth. Accordingly, the SCCH for UE3_1, UE3_2, UE3_3 and UE3_4 are mapped so that the physical channel symbols from the corresponding PSCCH are all confined to a same block of 300 consecutive active sub-carriers.

The physical channel symbols from all PSCCHs occupy the same number of sub-carriers within each block. Accordingly, in the exemplary embodiment shown in FIG. 3, each PSCCH occupies 75 sub-carriers within each block of 300 active sub-carriers.

Figure 4:
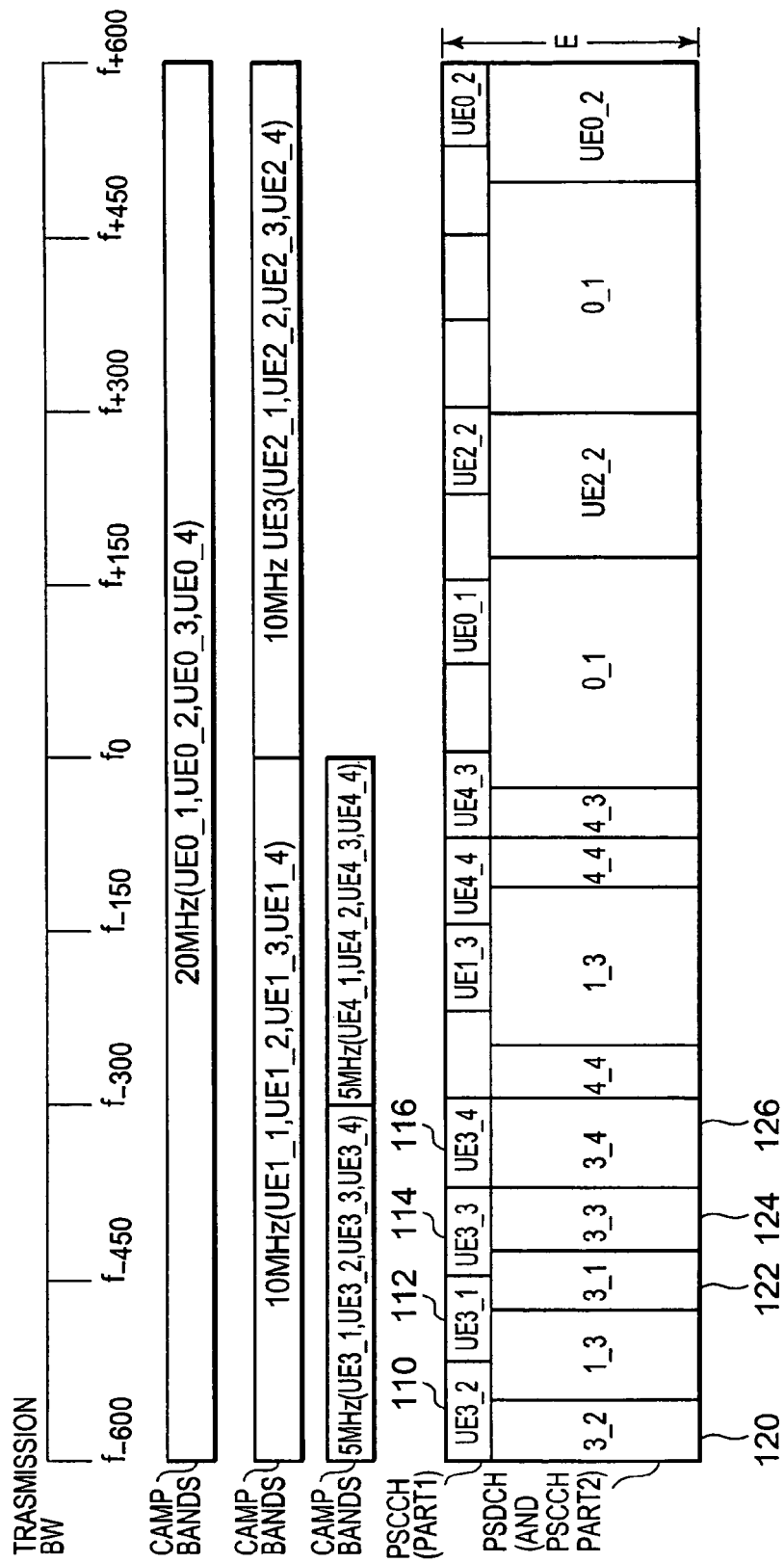
FIG. 4 is a schematic representation of a second embodiment of a mapping of the SCCH to PSCCH and SDCH to PSDCH for UEs of different capacities operating in the wideband communication system.

The physical channel symbols from all PSCCHs also share the same position mapping pattern. In FIG. 3 and FIG. 4, the physical channel symbols are mapped to consecutive sub-carrier positions within each block. Accordingly, there is no overlap between the physical channel symbols in the PSCCH for UE3_4, UD3_3, UE3_1 and UE3_2 and the physical channel symbols of each PSCCH occupy consecutive sub-carrier positions.

Figure 6:
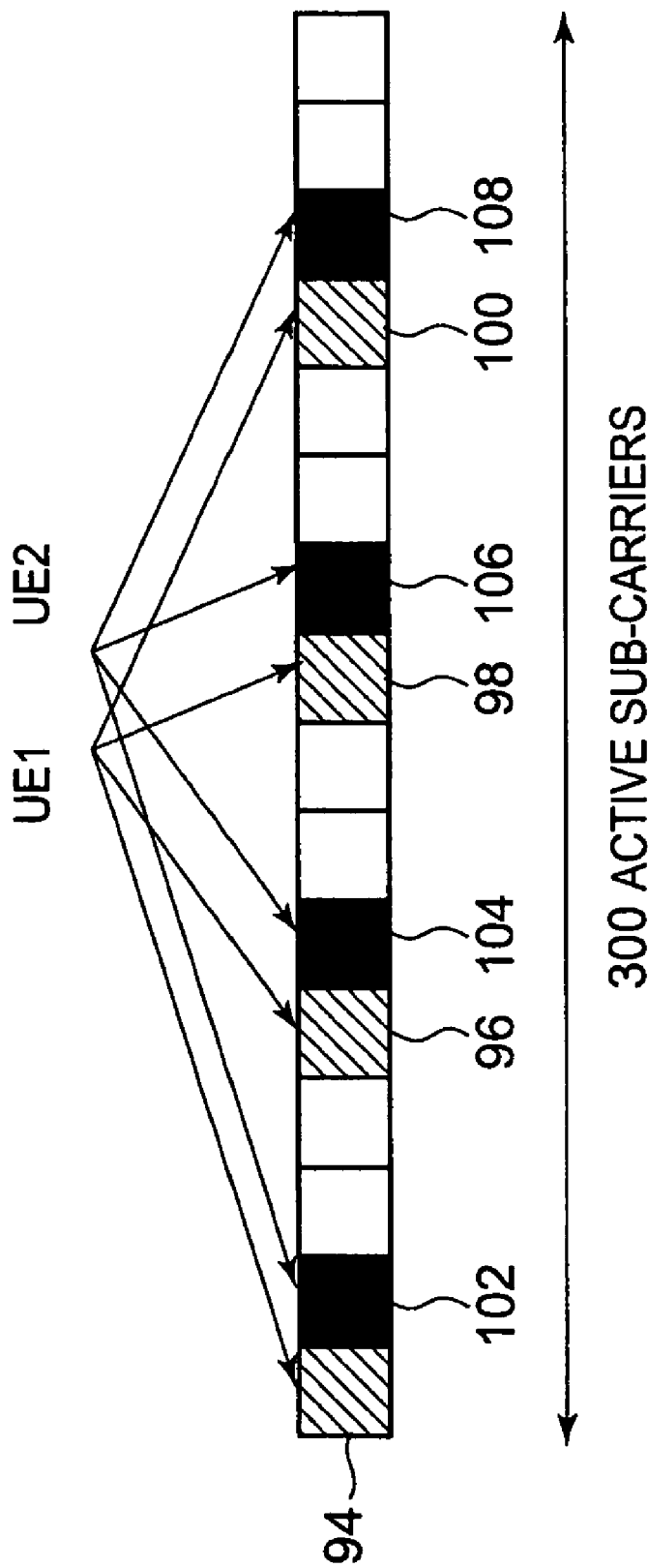
FIG. 6 is a schematic diagram showing the physical channel mapping for SCCH where PSCCHs consist of distributed sub-carriers within a same block of 300 consecutive active sub-carriers.

Alternately, the physical channel symbols for each PSCCH may be mapped to distributed sub-carrier positions within each block. FIG. 6 illustrates this principle and shows how physical channel symbols 94 to 100 from the PSCCH for UE 1 are mapped to distributed sub-carrier positions within the block of 300 active sub-carriers. Similarly, physical channel symbols 102 to 108 for the PSCCH of UE 2 are mapped to distributed sub-carrier positions within that same block and according to the same mapping pattern as the physical channel symbols for the PSCCH of UE 1. Specifically, the physical channel symbols of the PSCCH are arranged in four sub-blocks each spanning several sub-carriers, and the sub blocks are arranged in an evenly spaced pattern throughout the 300 sub-carrier block. This same position mapping pattern holds for all UEs Causing the physical channel symbols from all PSCCHs to occupy the same number of sub-carriers within each block of 300 active sub-carriers and to share the same position mapping pattern optimises the flexibility in the way PSCCHs of UEs having different transmission bandwidth capabilities and can be multiplexed. The scheduling complexity required to manage the SCCHs in such a system is minimised since all SCCHs are transmitted in a manner defined by the 5 MHz reception bandwidth of smallest UE capability. This requirement means that the channel coding (or puncturing) rate for high capability UEs is greater than for lower capability UEs. In order to achieve the same target channel quality for SCCHs for UEs having different capabilities, the power allocation of each SCCH can be controlled according to the CQI information transmitted from each UE to the base station.

In the example of FIG. 3, it should be noted that the SCCH and its SDCH are not necessarily scheduled to be in the same sub-carriers within a TTI, for example, the SCCH of UE3_4 and its corresponding SDCH lie at opposite ends of the first 300 sub-carrier block. However in some cases, such as for UE4_3, the SCCH and SDCH may be aligned or overlap.

In either case the SCCH and its corresponding SDCH fall within the reception band on which the particular UE is camped. Thus, the SDCH for a 5 MHz capacity UE (e.g. UE3_1) will fall within the same 301 sub-carrier block, whereas the SDCH for a 20 MHz capacity UE (e.g. UE0_1) can fall anywhere within the entire 1201 sub-carriers transmission bandwidth of the BTS.

It should be noted that in some situations that the SCCH does not fit into one OFDM symbol in which case it may be continued in a second symbol. In this case the mapping of SCCH and SDCH channels should at least partially overlap or preferably be fully aligned i.e. be on the same sub-carriers. Such a situation is shown in FIG. 4, which depicts an alternative channel mapping for a plurality of UEs having different reception bandwidth capabilities in communication with a BTS, which forms part of an OFDMA system. In FIG. 4 the SDCH (and PSDCH) for each UE and its corresponding SCCH are mapped in such a way as they are either aligned or at least partially overlap. In other respects FIG. 4 is identical to FIG. 3. Take UEs 3_2, 3_1, 3_3 and 3_4 as examples. In each case the PSCCH (110, 112, 114, 116) for each UE is mapped into the first 300 sub-carrier block of the transmission bandwidth of the BTS. Each corresponding PSDCH (120, 122, 124, 126 respectively) is mapped to an band of sub-carriers that overlap the sub-carrier allocation of the corresponding PSCCH.

By aligning the first and second part of the SCCH (in the frequency domain) the amount of detection performed by the UE is minimised. For example, when UE receives the first OFDM symbol, it does not know where its SCCH is located in frequency domain, so the UE needs to perform detection of this. Once UE finds the position of SCCH Part 1 it is highly advantageous to have SCCH Part 2 located in the same frequency position in the $2^{nd}$ OFDM symbol to avoid the UE having to detect its positions.

Figure 5:
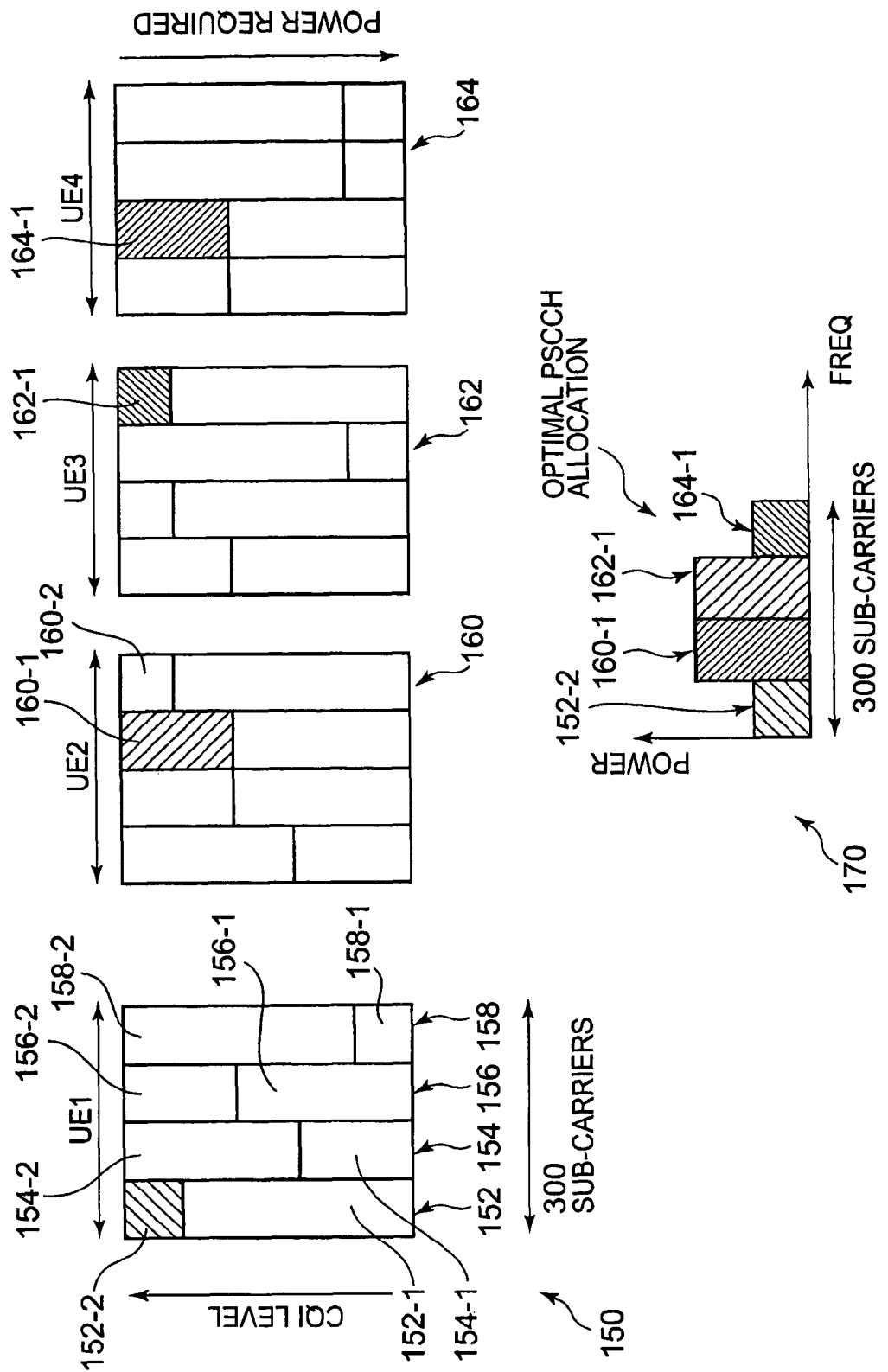
FIG. 5 is a diagram illustrating the power control of the SCCHs intended for the UEs of the wideband communication system where each SCCH is mapped on a set of consecutive physical active sub-carriers.

FIG. 5 illustrates the manner in which the CQI based power control can be carried out to control performance of each SCCH, in an embodiment of the present invention.

FIG. 5 depicts the situation of a 5 MHz camp band where maximum of 4 UEs can be simultaneously scheduled in one TTI. In the present example, each PSCCH is localised in a set of consecutive sub-carriers. In this arrangement, the SCCH for each UE can occupy one of 4 different 75 sub-carrier positions within a block of 300 active sub-carriers. Taking UE1 as an example, FIG. 5 illustrates at 150 the four possible positions 152, 154, 156, 158 that can be occupied by the SCCH for UE1 within a 300 sub-carrier block. For each position 152, 154, 156, 158 within the block 150 an average CQI level reported by the UE1 is indicated as a bar 152.1, 154.1, 156.1, 158.1. Similarly for each of the four positions 152, 154, 156, 158 a power level is indicated by bars 152.2, 154.2, 156.2, 158.2. These power levels indicate the transmit power required so that the received power for the PSCCH would meet minimum performance requirements if the PSCCH were to be transmitted in the particular location in the 300 sub-carrier block 150. As can be seen for each 75 sub-carrier location 152, 154, 156, 158 within the 300 sub-carrier block the higher the average reported CQI, the smaller required Tx power.

Similar diagrams are also provided for UEs 2, 3 and 4 and are labelled 160, 162 and 164 respectively.

Using the above CQI information power control can be implemented by assigning the location of the PSCCHs, within a block of 300 active sub-carriers, for each of the scheduled UEs in the frequency domain should be chosen so that total power allocated to all PSCCHs is minimised. Generally speaking, the higher the average CQI a UE sees, the lower power allocation is required for its PSCCH.

In the present example the resulting power allocation and location assignment is shown in graph 170. In this case for UE's 1, 3 and 4 the PSCCH allocation with minimal power requirement 152.2, 162.1 and 164.1 respectively are used in the final allocation 170. However for UE2 the allocated PSCCH position 160.1 is not the minimum possible power allocation 160.2, due to the need to minimise the total power allocation rather than power allocations for individual UEs.

In certain embodiments, power control can even be performed with higher resolution if a UE reports 2 or more CQIs per PSCCH location. In this case the sum of the 2 or more determined powers is equal total power allocated to that UE. To further illustrate this point an example will be given. In this example, each UE reports 8 CQIs per block of 300 sub-carrier block (that is 2CQIs per location).

For each User, 4 average CQIs are calculated using the pairs of reported CQIs corresponding to the 4 possible locations. Next 4 corresponding power levels are computed corresponding to each location.

For each out of 24(24=4!) possible combinations of locations (remembering that there are four UEs and 4 possible locations with the 300 sub-carrier block), the total power required by all UEs is calculated. The combination that requires the minimum total power is then selected.

Next power allocation is performed by splitting the 75 sub-carrier band allocated into 2 parts (corresponding to the two reported CQIs) and allocating power levels to those 75 sub-carriers so that at the UE, the received power for all 75 sub-carriers would be the same.

In an alternative embodiment, power control can be implemented by assigning the location of the PSCCHs, across the entire transmission bandwidth (as opposed to with in a block of 300 active sub-carriers) for each of the scheduled UEs. In this case in the frequency domain locations of each PSCCH should be chosen so that total power allocated to all PSCCHs across the entire transmission bandwidth is minimised. In this case, the allocation of locations will be subject to certain constraints such as UE maximum reception bandwidths, camping bands and presence of other scheduled UEs.

It will be appreciated that if the distributed physical resource allocation shown in FIG. 6 is applied on each SCCH, then the same principle of power control as mentioned previously can be also used.

Whilst the invention has been shown and described with reference to certain embodiments thereof, it will be understood by those skilled in the art that various changes in the form and details may be made without departing from the spirit or scope of the invention as defined by the appended claims.

The invention claimed is:

1. A method of physical resource management in a wideband communication system, the wideband communication system including a base station for transmitting on a plurality of physical sub-carriers occupying a predetermined transmission bandwidth and a plurality of mobile terminals (MT) each having different maximum reception bandwidths within the predetermined transmission bandwidth and camping on, the method being performed in the base station and including:
   identifying a smallest maximum reception bandwidth, within the predetermined transmission bandwidth, amongst the plurality of MT;
   determining a plurality of blocks of consecutive sub-carriers from the predetermined transmission bandwidth and the smallest maximum reception bandwidth, the consecutive sub carriers being defined by the smallest maximum reception bandwidth amongst the plurality of MT; and
   mapping a Shared Control Channel (SCCH) for each MT so that physical channel symbols from Physical Shared Control Channels (PSCCH) corresponding to the SCCH are confined to a block size of one of the plurality of blocks of the consecutive sub-carriers defined by the smallest maximum reception bandwidth amongst the plurality of MT,
   wherein physical sub-carriers of the SCCH have positions that are made to correspond to positions of physical sub-carriers of the PSCCH.

2. A method of physical resource management according to claim 1, wherein mapping the SCCH for each MT includes:
   causing the physical channel symbols of the corresponding PSCCH to occupy a same number of sub-carriers as the PSCCH of each other MT.

3. A method of physical resource management according to claim 1, wherein the mapping the SCCH for each MT includes:
  causing the physical channel symbols from the corresponding PSCCH to have a same position mapping pattern as the PSCCH of each other MT.

4. A method of physical resource management according to claim 3, wherein the mapping the SCCH for each MT includes:
  mapping the physical channel symbols to consecutive sub-carrier positions within its corresponding block.

5. A method of physical resource management according to claim 3, wherein the mapping the SCCH for each MT includes:
  mapping the physical channel symbols to distributed sub-carrier positions within its corresponding block.

6. A method of physical resource management according to claim 1, and further including:
  adjusting power and/or the sub-carrier positions allocated to at least one PSCCH on a basis of at least one received channel quality indication (CQI) for each PSCCH.

7. A method of physical resource management according to claim 1, the method further including:
  selecting sub-carrier positions occupied by the physical channel symbols from each PSCCH within each block so that a total power allocated to all PSCCHs in that block is minimized.

8. A method of physical resource management according to claim 1, the method further including:
  selecting sub-carrier positions occupied by the physical channel symbols from each PSCCH so that a total power allocated to all PSCCHs is minimized across the predetermined transmission bandwidth.

9. A method of physical resource management according to claim 6, wherein said total power allocation is made on the basis of a plurality of received CQIs per PSCCH.

10. A method of physical resource management according to claim 7, and further including:
  assessing channel quality by averaging a received channel quality indication (CQI) over a plurality of Transmission Time Intervals (TTIs).

11. A method of physical resource management according to claim 7, and further including:
  assessing channel quality by averaging a plurality of channel quality indications (CQIs) received in relation to a set of sub-carriers occupied by a PSCCH in a same Transmission Time Interval (TTI).

12. A method of physical resource management according to claim 1, wherein the wideband communication system operates according to Orthogonal Frequency Division Multiple Access (OFDMA) principles.

13. A method of physical resource management according to claim 1, wherein the predetermined transmission bandwidth is selected from a group including 5 MHz, 10 MHz, 15 MHz and 20 MHz.

14. A method of physical resource management according to claim 1, wherein the maximum reception bandwidth of each of the MTs is one of the following bandwidths 5, 10, 15 or 20 MHz.

15. A base station for transmitting on a plurality of physical subcarriers occupying a predetermined transmission bandwidth and forming part of a wideband communication system together with a plurality of mobile terminals, the base station including one or more components to implement a method according to claim 1.

16. A method of physical resource management according to claim 7, wherein said total power allocated is allocated on a basis of a plurality of received channel quality indications (CQIs) per PSCCH.

17. A method of physical resource management according to claim 8, wherein said total power allocated is allocated on a basis of a plurality of received channel quality indications (CQIs) per PSCCH.

18. A method of physical resource management according to claim 8, and further including:
  assessing channel quality by averaging received CQIs over a plurality of Transmission Time Intervals (TTIs).

19. A method of physical resource management according to claim 9, and further including:
  assessing channel quality by averaging a received channel quality indication (CQI) over a plurality of Transmission Time Intervals (TTIs).

20. A method of physical resource management according to claim 8, and further including:
  assessing channel quality by averaging a plurality of channel quality indications (CQIs) received in relation to a set of sub-carriers occupied by a PSCCH in a same Transmission Time Interval (TTI).

21. A method of physical resource management according to claim 9, and further including:
  assessing channel quality by averaging a plurality of CQIs received in relation to a set of sub-carriers occupied by a PSCCH in a same Transmission Time Interval (TTI).

22. A method of physical resource management according to claim 10, and further including:
  assessing channel quality by averaging a plurality of CQIs received in relation to a set of sub-carriers occupied by a PSCCH in a same Transmission Time Interval (TTI).

* * * * *